United States Patent [19]

Finzel

[11] Patent Number: 5,195,153
[45] Date of Patent: Mar. 16, 1993

[54] CRIMP SPLICE

[75] Inventor: Lothar Finzel, Unterschleissheim, Fed. Rep. of Germany

[73] Assignee: Siemens Aktiengesellschaft, Munich, Fed. Rep. of Germany

[21] Appl. No.: 809,671

[22] Filed: Dec. 18, 1991

[30] Foreign Application Priority Data

Dec. 20, 1990 [DE] Fed. Rep. of Germany ....... 4041030

[51] Int. Cl.⁵ .............................................. G02B 6/38
[52] U.S. Cl. ...................................... 385/70; 385/137
[58] Field of Search ...................... 385/65, 69, 58, 71, 385/77, 70, 136, 137

[56] References Cited

U.S. PATENT DOCUMENTS

| | | | |
|---|---|---|---|
| 4,629,284 | 12/1986 | Malavieille | 385/70 |
| 4,634,216 | 1/1987 | Calevo et al. | 385/65 |
| 4,784,456 | 11/1988 | Smith | 385/71 |
| 4,818,055 | 4/1989 | Patterson | 350/96.20 |

FOREIGN PATENT DOCUMENTS

228654 A1 10/1985 Fed. Rep. of Germany .
3833228 C1 12/1989 Fed. Rep. of Germany .

*Primary Examiner*—John D. Lee
*Assistant Examiner*—John Ngo
*Attorney, Agent, or Firm*—Hill, Steadman & Simpson

[57] ABSTRACT

The crimp splice serves the purpose of connecting light waveguide fibers which are fixed by radial pressure. For this purpose, the light waveguide fibers are placed in a guide channel in the base surface or area of, for example, an outer part, are pressed against one another, and are fixed by a clamping action between an inner part and the outer part. A required pressing power for the clamping is achieved by pressing legs of the two parts together. The crimp splice is simple to produce and permits easy assembly.

20 Claims, 6 Drawing Sheets

CRIMP SPLICE

BACKGROUND OF THE INVENTION

Various mechanical splice connections for light waveguides are known. Thus, U.S. Pat. No. 4,818,055, incorporated herein, discloses a splice connection wherein the light waveguide fiber (core and sheath) is guided and clamped in a splice element which is bent U-shaped The splice element is part of a splice connection that also contains housing and fastening devices for the splice element and the light waveguides. This splice connection is extremely involved. Moreover, strict tolerancing of the components is required in order to fix the light waveguide fibers with a defined pressing power.

SUMMARY OF THE INVENTION

It is therefore an object of the invention to specify a mechanical splice that can be simply produced.

This object is achieved by a crimp splice according to the invention wherein an oblong outer part is provided which has a base portion designed as a surface, and which also has two angled-off legs that can be bent together. An inside part is fitted into the outside part. A guide channel for acceptance of light waveguide fibers between the inner part and outer part is provided. This guide channel is located in a direction of a longitudinal axis in the base portion surface of the outer part or a base portion surface of the inner part. The guide channels at opposite ends of the crimp splice are enlarged for acceptance of a relatively thicker coated portion of the respective light waveguides.

The simple structure of the crimp splice is advantageous. This also guarantees a simple splicing of the light waveguides with a simple tool.

It is especially advantageous when the inner part and the outer part of the crimp splice (crimping=pressing) is produced of sheet metal bent in U-shaped fashion. After the introduction of the light waveguide, the legs of the two parts are bent together. The required radial pressing power for the light waveguide fibers is thereby produced.

It is advantageous when one part, for example the outer part, is designed longer than the other part and comprises guide means for the light waveguide fibers. The insertion into the guide channel is thus considerably facilitated.

It is advantageous when the base of the outer part is inwardly arced and/or the base of the inner part is outwardly arced. Cavities in the corners of the U-shaped parts thus arise which, due to the capillary effect, prevent an emergence of the coupling fluid required for the splicing that is adapted to the refractive index of the light waveguide cores.

A mechanical fastening of the inner and of the outer part with form-fitting joining elements such as, for example, folds, clips, recesses, eyelets or beads is expedient. Screwed or riveted connections can thus be foregone and the splicing is merely comprised in pressing the inner part further into the outer part and bending the legs together.

It is expedient to provide two catch steps between the inner and the outer part. The introduction of the light waveguide fibers occurs in the first catch step, and the light waveguide fibers are already pre-fixed in the second catch step. The required pressing power for fixing the fibers is produced by pressing the legs of the outer part together.

It is advantageous when the inner part is produced of a thinner, elastic sheet metal, whereas the outer part is fabricated of a bendable sheet metal having lower elasticity.

It is also possible to manufacture the inner part as a cuboid or as a hollow profile, for example of plastic material as well. The outer profile can have a significantly broader base than the inner profile around which it is then bent.

It is preferable when the sheet metals employed have a low coefficient of thermal expansion. As a result thereof, the pressing power changes only slightly, given temperature fluctuations.

It is advantageous when the guide channels provided in the inner part or in the outer part for the insertion of the light waveguide fibers are widened at their ends such that the light waveguide fibers with a coating thereon are guided and, as warranted, can also be pressed for strain relief. This not only facilitates the introduction of the light waveguide fibers; a protection against buckling and, potentially, a strain relief, also automatically results due to the widened guide channels.

It is preferable to provide two or more different steps in the widened guide channel for various light waveguide diameters. As a result thereof, light waveguides having different outside diameters can be employed for splicing, or a single embodiment of the crimp splice can also be employed for different light waveguides.

DESCRIPTION OF THE PREFERRED EMBODIMENTS

Figure 1:
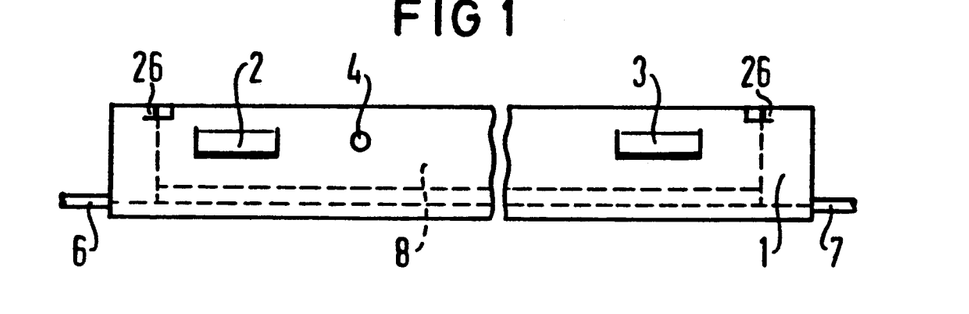
FIG. 1 is a side view of the crimp splice.

FIG. 1 shows the side view of a crimp splice. Its outer part 1 is connected to an inner part 8 at the legs by clips 2, 3 (and further clips that are not visible in this view). Two light waveguides 6 and 7 whose fibers abut in a guide channel (not shown here for reasons of clarity, but shown below at 24 in FIG. 3 or 12 in FIG. 2) are fixed between the bases of the two parts 1 and 8. The inner part is positioned in the outer part by two lateral guides 26.

Figure 2:
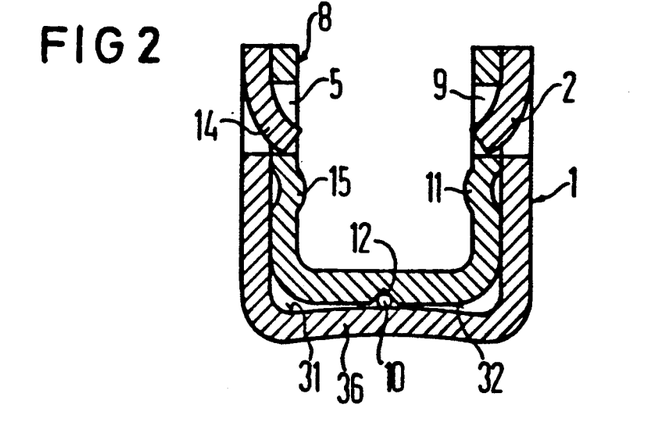
FIG. 2 is a sectional view of the crimp splice.

FIG. 2 shows the crimp splice in section. The outer part 1 is formed by a base portion 36 and the legs 28 and 29. A light waveguide fiber 10 (fiber; core and sheath) is fixed in a guide channel 12 in inner part 8 (only schematically shown) by the outer part 1 pressing against the fiber. The fiber 10 is fixed between the base areas 31 and 32 of the outer part 1 and of the inner part 8, which, for example, are each respectively produced of sheet metal bent in U-shaped fashion or trapezoidally, namely in the middle of the base area 32 of the inner part. The inner part is connected to the outer part by angled clips 2 and 14 that project into recesses 9 and 5 of the inner part. Longitudinal beads 11 and 15 which initially project into the clips of the outer part 1 provide a first catch position of the inner part in the outer part when the light waveguide fibers are being first introduced between the base areas of the outer and inner parts. The crimp splice is supplied for mounting of the light waveguides in this first catch position.

The light waveguide fibers whose coating was removed over a length given by the dimensions of the crimp splice are pushed against one another in the guide channel 12 and are then fixed by pressing the inner part into the second catch position wherein the inner part 8 is joined to the outer part 1 at the legs with clips 2 in recesses 9. Subsequently, the legs of the crimp splice are bent together in order to achieve a higher radial pressing power, as a result whereof the inner part is crushed or clenched, and the outer part is stretched. The fixing occurs entirely or partially on the basis of the pressure exerted onto the light waveguide fibers.

Figure 3:
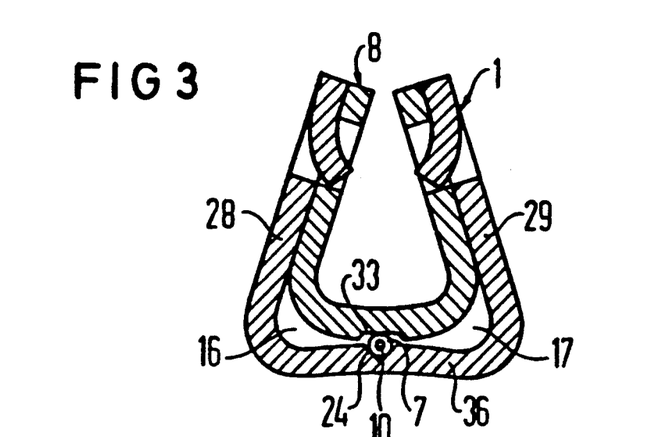
FIG. 3 is a completely assembled crimp splice.

The legs 28 and 2 of the crimp splice are bent together in FIG. 3. Two clearances 16 and 17 thus derive such that, due to the capillary effect, they prevent the coupling fluid, required in assembly for joining the light waveguide fibers, from emerging. This coupling fluid is already applied when delivering the crimp splice to the junction location of the light waveguides.

Figure 10:
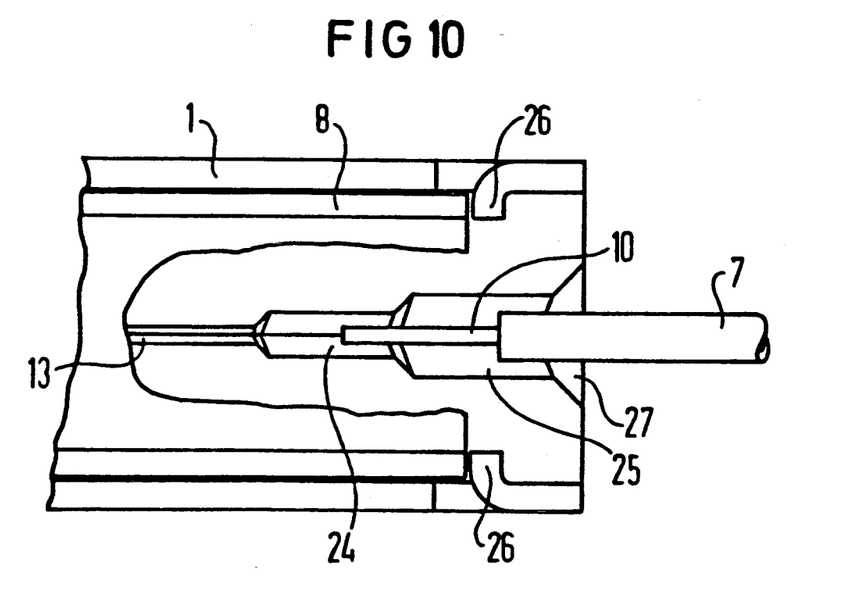
FIG. 10 is a view of the guide channels.

The outer part 1 can be fabricated of any plastifiable material. After the legs are pressed together, they should not spring back too greatly. Thin and elastic material can be employed for the inner part 8. It thus exerts low force onto the legs of the outer part and manages a constant pressing power against the light waveguide fibers. A guide channel 13 for the light waveguide fibers as shown in FIG. 10 proceeds in the base part 36 of the outer part here in this alternate embodiment for the guide channel. As a result of the sectional view shown here that proceeds through a widened guide channel 24, however, it cannot be seen; it can, however, be derived from FIG. 10 showing both the narrower guide channel 13 and widened guide channel 24.

The widened guide channel 24, and an upper guide channel 33 widened because of manufacturing tolerances, serve for the acceptance of the coated light waveguide in the FIG. 3 embodiment. The light waveguide is conducted through these channels in order to achieve an anti-buckling protection for the respective fiber, and may potentially be pressed thereagainst for strain relief.

On the basis of incisions into the legs and into the base area, the inner part and the outer part can be designed such that a largely separate pressing of the coating and of the fiber occurs.

Figure 4:
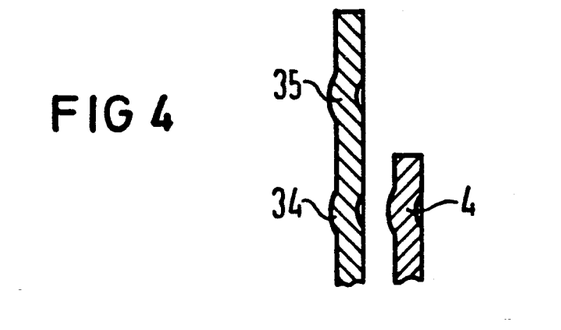
FIG. 4 is a first form-fitting possibility for joining.

FIG. 4 shows a further possibility for achieving a form-fitting connection. The clip 2 here projects into an eyelet 18 of the inner part. When the eyelet is applied more deeply, or given a recess, the clip can also proceed obliquely relative to the plane of the legs in order to always guarantee a reliable connection. The mechanical strength is deteriorated less given the employment of eyelets instead of recesses.

Figure 5:
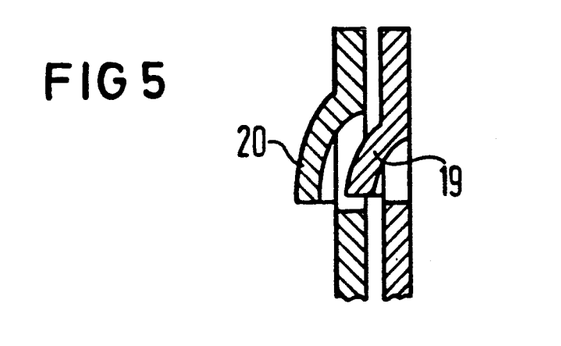
FIG. 5 is a further form-fitting possibility for joining.

In FIG. 5, two half-beads 19 and 20 engage into one another. The mechanical stability of the crimp splice is thereby further enhanced.

Figure 6:
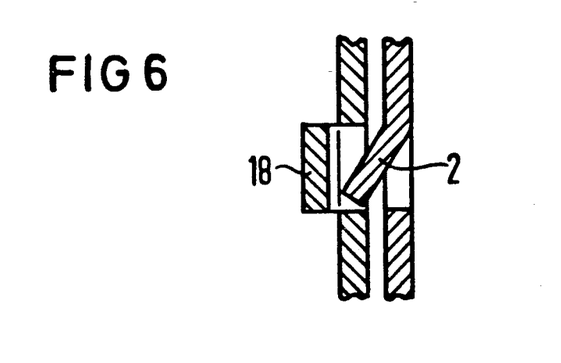
FIG. 6 illustrates the employment of beads for achieving a further catch step.

FIG. 6 shows a further possibility for achieving a further catch position. A bead 4 (also shown in FIG. 1) in the leg of the outer part engages into a bead 34 of the inner part at the first catch position; it is accepted by a second bead 35 of the inner part in the second, ultimate catch position so that the legs of the two parts can lie intimately against one another.

Figure 7:
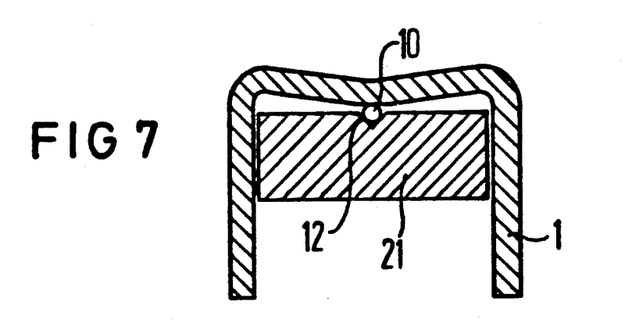
FIG. 7 shows the use of a cuboid or hollow member as an inner part.
Figure 8:
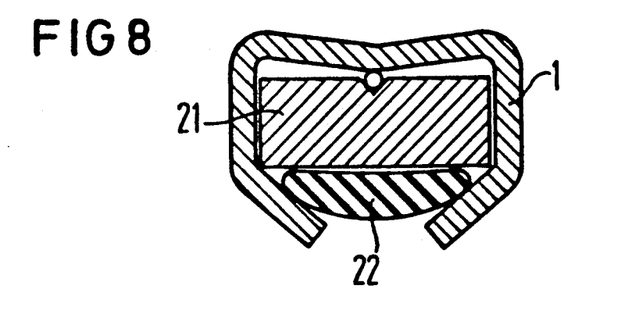
FIG. 8 is a version of the finished crimp splice.

A cuboid inner part 21 that also comprises the guide channel 12 for the acceptance of the light waveguide fibers 10 is provided in the crimp splice shown in FIG. 7. For example, this inner part can be fabricated of plastic. The light waveguide fibers are fixed by bending the legs of the outer part 1 over. In order to obtain a constant pressing power that is largely independent of the assembly, an elastic transition piece 22 can also be placed under the legs (FIG. 8).

Figure 9:
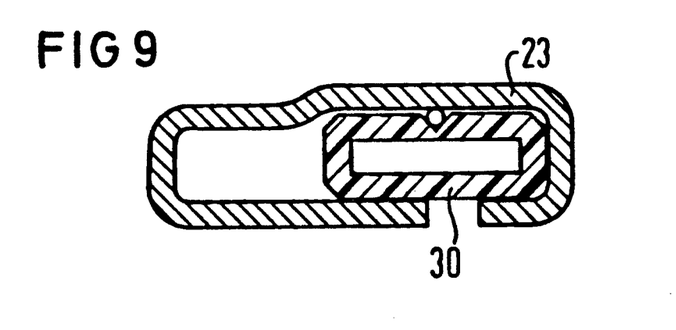
FIG. 9 is a version of the outer part.

FIG. 9 shows a crimp splice whose outer part 23 has a broadened base area. A simpler, defined pressing is possible in this version. The broadening can also be at both sides when a guide for the inner part is provided in the outer part. The inner part is fabricated of a hollow profile 30 here. The guide channel schematically shown in FIGS. 7 through 9 can be designed in accordance with the exemplary embodiment of FIG. 3.

The guide channels in the outer part of the crimp splice of FIG. 1 are enlarged and not shown true-to-scale in FIG. 10. The first guide channel 13 serves the purpose of accepting the light waveguide fibers. The second guide channel 24 is provided for a light waveguide (including coating) having a smaller outside diameter; and the third guide channel 25 is matched to the diameter of a light waveguide having a larger outside diameter.

The light waveguide fibers can be placed from above into the largest guide channel in order to then be pushed into the narrower guide channels for splicing. Due to a widened portion 27, the light waveguide having a coating can also be easily pushed into the second or third guide channel. The guide channels including the widened portion can be produced by stamping or by etching. As intrinsically known, the guide channels can comprise a V-shaped or trapezoidal cross section, and can be provided in the outer part or inner part, or in both parts.

Figure 11:
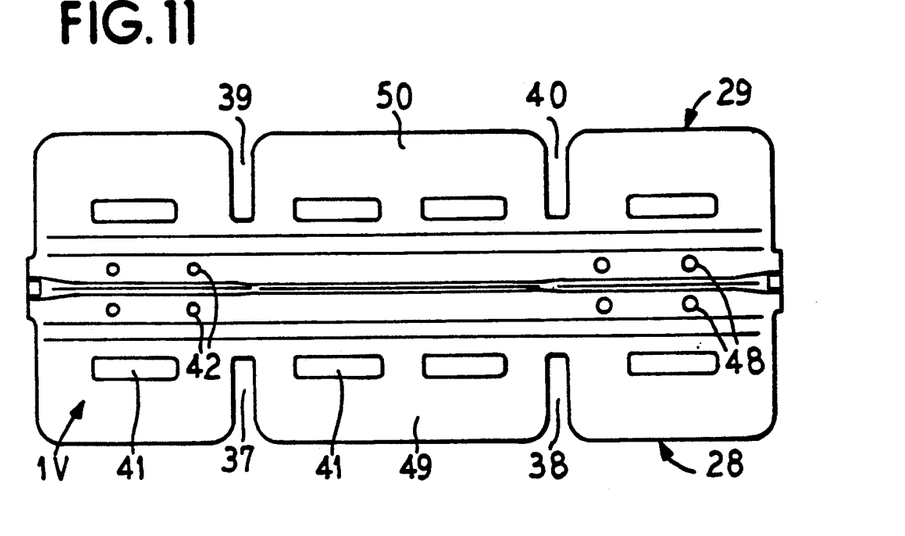
FIG. 11 is a plan view of a version of the outer part.

FIG. 11 shows a version of the outer part 1V wherein the legs 28, 29 are subdivided by two incisions 37 and 38 or 39 and 40 to form three leg portions. The middle leg portions 49 and 50 later serve the purpose of producing the necessary pressing power for the light waveguide fibers. In order to facilitate a bending of the leg portions, shaped passages 41 are always provided. However, a plurality of bores can also be employed. The base portion also comprises spacers 42, 48 that are designed as beads.

Figure 12:
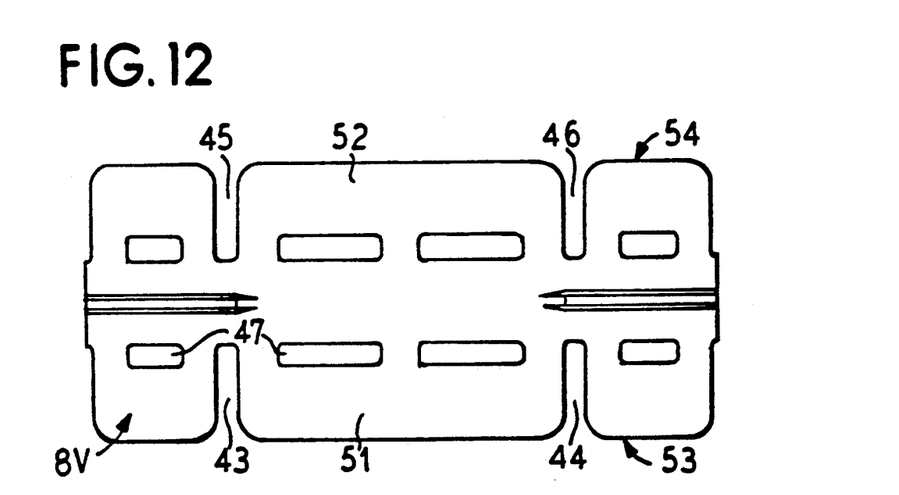
FIG. 12 is a bottom view of the corresponding version of the inner part.

The inner part 8V shown in FIG. 12 is designed in conformity with the outer part. The incisions 43 through 46 in the legs 53, 54 nearly coincide with the incisions of the outer part 1V. Corresponding passages 47 are also again provided with which the legs 53, 54 are respectively divided into three leg portions. The middle leg portions 51 and 52 in the inner part 8V have a somewhat greater length than the middle leg portions 49, 50 in the outer part 1V. The outer leg portions of the inner part 8V, by contrast, are shorter than the outer leg portions of the outer part 1V as shown most clearly in FIG. 13.

Figure 13:
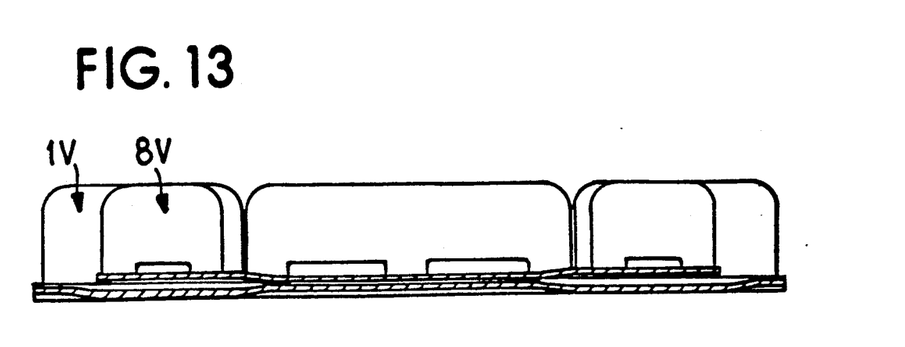
FIG. 13 is a section through the crimp splice with bent-off legs.

FIG. 13 shows a section through the longitudinal axis of the outer part 1V with the inserted inner part 8V, given legs bent up at right angles. Since the middle leg portions 51, 52 of the inner part 8V are slightly longer than the middle leg portions 49, 50 of the outer part 1V, only a narrow gap can be respectively seen. The introduction openings for the light waveguide fibers can also be seen.

Figure 14:
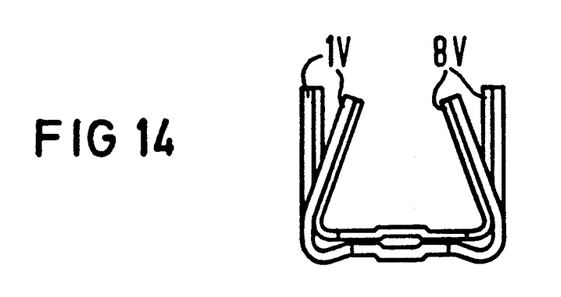
FIG. 14 shows a side view of the crimp splice.
Figure 15:
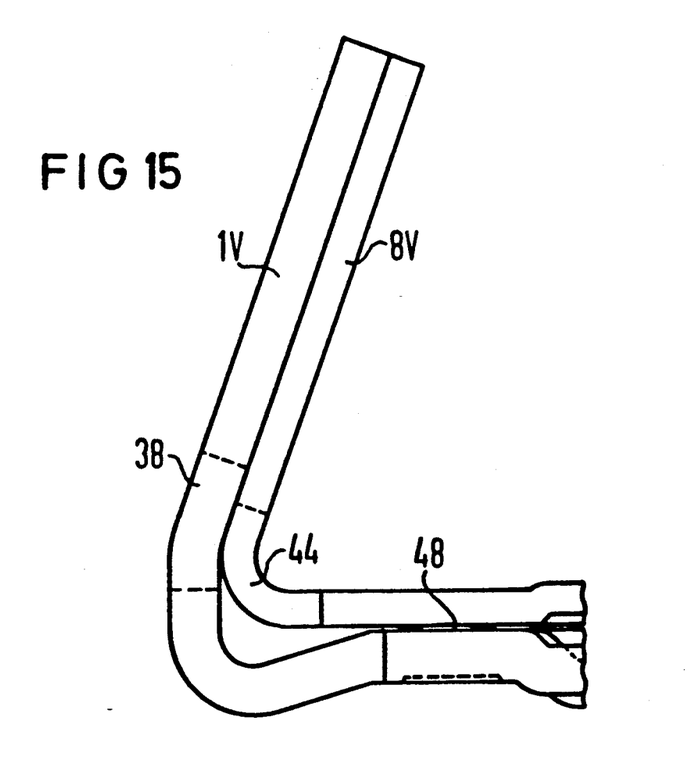
FIG. 15 illustrates details of the crimp splice after the mounting of the light waveguide fibers.

FIG. 14 shows the condition in which the crimp splice is delivered. The outer leg portions are inwardly angled off so that the inner part 8V is held in non-slidable fashion in the outer part 1V in a longitudinal direction as well. The light waveguide fibers can be introduced in this condition. Subsequently, the middle leg portions 49, 50 and 51, 52 are also bent together, as shown in FIG. 15. The pressing power is thereby arising in the middle portion of the crimp splice which presses against the light waveguide fibers and fixes them. The outer regions of the crimp splice can be designed such that a fixing of the coating occurs when one continues to press the outer leg portions together. Dependent on the materials employed, it may be more expedient to fix only the light waveguide fibers in order to avoid stresses caused by temperature fluctuations.

Although various minor changes and modifications might be proposed by those skilled in the art, it will be understood that I wish to include within the claims of the patent warranted hereon all such changes and modifications as reasonably come within my contribution to the art.

I claim as my invention:

1. A crimp splice for splicing ends of fibers of two light waveguides together, comprising:
   an oblong U-shaped cross-section outer part that has a base portion with an inner surface and having two legs angled with respect to the base portion and which are formed by a bendable material means for allowing the legs to maintain a bent together position after they have been bent together from a spread apart position;
   an inner U-shaped cross-section part fitted into said outer part, said inner part having a base portion with an outer surface, said inner and outer parts each having said U-shaped cross-section but with the legs bent together in a position which causes the respective light waveguide fibers to be clamped between the base portions of the inner and outer parts;
   guide channel means for acceptance of the respective light waveguide fibers between the respective base portions of the inner and outer parts, said guide channel means proceeding in a direction of a longitudinal axis in at least one of said outer part base portion inner surface or said inner part base portion outer surface; and
   ends of said guide channel means at opposite ends of the crimp splice being expanded so as to accept portions of the respective light waveguide fibers which are coated.

2. A crimp splice according to claim 1 wherein the inner part and outer part each having incisions extending from outer edges inwardly toward a bending line along the longitudinal axis thereof which divide the legs into a middle leg portion and outer leg portions.

3. A crimp splice according to claim 2 wherein the leg portions have passage means proceeding parallel to the bending line for facilitating a bending of the leg portions.

4. A crimp splice according to claim 1 wherein form fitting means secures the outer part to the inner part.

5. A crimp splice according to claim 4 wherein the inner part has two legs angled with respect to the base portion, and said form fitting means comprising a means for joining legs of the outer part to the inner part when the inner part is pressed into the outer part.

6. A crimp splice according to claim 1 wherein said inner part has two legs angled with respect to the base portion, and said inner and outer parts are shaped such that after the legs are pressed together and bent inwardly, a triangular cross section results.

7. A crimp splice according to claim 1 wherein the inner part is designed as a cuboid.

8. A crimp splice according to claim 1 wherein the inner part is designed as a rectangular member with an inner hollow profile.

9. A crimp splice according to claim 1 wherein the outer part and the inner part differ in length along longitudinal axes thereof, and the longer part has the guide channel means.

10. A crimp splice according to claim 1 wherein the inner surface of the base portion of the outer part is inwardly arced.

11. A crimp splice according to claim 1 wherein the outer surface of the base portion of the inner part is outwardly arced.

12. A crimp splice according to claim 1 wherein a first catch step means is provided for joining the inner part and the outer part such that the base portions of the inner part and outer part are spaced sufficiently to permit introduction of the waveguide fibers; and second catch step means for joining the inner and outer parts for fixing the light waveguide fibers in place and clamping between the inner and outer part base portions.

13. A crimp splice according to claim 1 wherein the guide channel means has outer portions which are wider than inner portions for accepting light waveguides coated with a coating resulting in larger outside diameters.

14. A crimp splice for splicing ends of fibers of two light waveguides together, comprising:
    an oblong outer part that has a base portion with an inner surface and having two legs angled with respect to the base portion and that can be bent together;
    an inner part fitting into said outer part, said inner part having a base portion with an outer surface;
    guide channel means for acceptance of the respective light waveguide fibers between the inner and outer parts, said guide channel means proceeding in a direction of a longitudinal axis in at least one of said outer part base portion inner surface or said inner part base portion outer surface;
    ends of said guide channel means at opposite ends of the crimp splice being expanded so as to accept portions of the respective light waveguide fibers which are coated;
    form fitting means for securing the outer part to the inner part; and
    the inner part having legs angled with respect to the base portion, and said form fitting means comprising inwardly protruding clips on legs of the outer part received in corresponding recesses on legs of the inner part.

15. A crimp splice according to claim 14 wherein said form fitting means further comprises beads adjacent to the recesses on the inner part legs such that said beads define a first catch position when engaged with ends of the angled clips and said recesses define a second catch position when engaged with the angled clips.

16. A crimp splice for splicing ends of fibers of two light waveguides together, comprising:
   an oblong outer part that has a base portion with an inner surface and having two legs angled with respect to the base portion and that can be bent together;
   an inner part fitting into said outer part, said inner part having a base portion with an outer surface;
   guide channel means for acceptance of the respective light waveguide fibers between the inner and outer parts, said guide channel means proceeding in a direction of a longitudinal axis in at least one of said outer part base portion inner surface or said inner part base portion outer surface:
   ends of said guide channel means at opposite ends of the crimp splice being expanded so as to accept portions of the respective light waveguide fibers which are coated; and
   said inner part having two legs angled with respect to the base portion, and the inner part and outer part are fabricated of sheet metal, and wherein the outer part has a lower elasticity than the inner part and is bendable.

17. A crimp splice for splicing ends of fibers of two light waveguides together, comprising:
   an oblong outer part that has a base portion with an inner surface and having two legs angled with respect to the base portion and that can be bent together;
   an inner part fitting into said outer part, said inner part having a base portion with an outer surface;
   guide channel means for acceptance of the respective light waveguide fibers between the inner and outer parts, said guide channel means proceeding in a direction of a longitudinal axis in at least one of said outer part base portion inner surface or said inner part base portion outer surface;
   ends of said guide channel means at opposite ends of the crimp splice being expanded so as to accept portions of the respective light waveguide fibers which are coated; and
   the outer part being fabricated of sheet metal having a low coefficient of thermal expansion.

18. A crimp splice according to claim 17 wherein the inner part is also fabricated of sheet metal having a low coefficient of thermal expansion.

19. A crimp splice for abutting ends of fibers of light waveguides against one another and maintaining the abutment, comprising:
   an outer part formed of a base portion having an inner surface and outer legs formed of a bendable material which, prior to bending, are substantially parallel to one another;
   providing an inner part receivable within the outer part, said inner part having a base portion;
   guide channel means in at least one of said base portions for receiving the respective light waveguides; and
   the inner part having a similar shape to the outer part and having legs extending substantially perpendicular relative to the base portion thereof, and means being provided for locking the first part to the outer part so as to exert a pressing power between the base portion surfaces of the inner and outer parts against the waveguides so as to hold the waveguides in place, and wherein a material of the inner and outer parts is selected so as to permit a bending of the legs of the inner and outer parts inwardly without substantially springing back so as to increase pressing on the waveguides between the two base surfaces.

20. A crimp splice for splicing ends of fibers of two light waveguides together, comprising:
   an oblong outer part that has a base portion with an inner surface and having two legs angled with respect to the base portion and that can be bent together;
   an inner part fitting into said outer part, said inner part having a base portion with an outer surface;
   guide channel means for acceptance of the respective light waveguide fibers between the inner and outer parts, said guide channel means proceeding in a direction of a longitudinal axis in at least one of said outer part base portion inner surface or said inner part base portion outer surface;
   ends of said guide channel means at opposite ends of the crimp splice being expanded so as to accept portions of the respective light waveguide fibers which are coated; and
   said inner part having a rectangular configuration, and at a portion of the inner part opposite the guide channel means an elastic adapter piece is provided around which ends of the legs of the outer part are bent.

* * * * *